United States Patent Office 3,474,109
Patented Oct. 21, 1969

3,474,109
IMIDAZOPYRROLONE DICARBOXYLIC ACIDS AND A PROCESS FOR THEIR PREPARATION
Munehiko Suzuki, Yokosuka-shi, Etsuo Hosokawa, Yokohama, and Shinsuke Hirata and Tetsuo Hoshino, Kawasaki-shi, Japan, assignors to Showa Electric Wire and Cable Co., Ltd., Kawasaki-shi, Japan, a corporation of Japan
Filed Dec. 29, 1966, Ser. No. 605,761
Claims priority, application Japan, Jan. 8, 1966, 41/844
Int. Cl. C07d *57/00*
U.S. Cl. 260—309.2  10 Claims

ABSTRACT OF THE DISCLOSURE

The compounds are of the class of novel imidazopyrrolone dicarboxylic acids, useful for production of polyester, polyamide and other various synthetic resins having improved thermal stability, and as cross-linking agents for expoxide and other synthetic resins. They are shown by the general formula

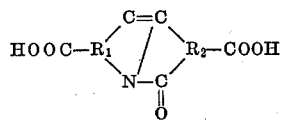

where $R_1$ and $R_2$ are trivalent aliphatic, aromatic or heterocyclic radicals, and have at least two carbon atoms. In case of heterocyclic radicals, one of the $R_1$ and $R_2$ may contain imidazopyrrolone ring. One example is

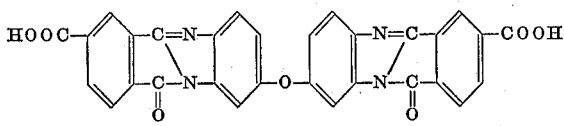

The process for preparing the compounds is that diaminomonocarboxylic acids are reacted with tricarboxylic acid anhydrides; tetra-amino compound (1 mole) is reacted with tricarboxylic anhydride (2 moles); diamino-monocarboxylic acid (2 moles) is reacted with tetracarboxylic dianhydride (1 mole).

BACKGROUND OF THE INVENTION

This invention relates to a novel class of imidazopyrrolone dicarboxylic acids which are useful for the production of various synthetic resins with improved thermal stability and are useful as cross-linking agents for epoxide and other synthetic resins, and to a process for the production thereof.

In the field of electric insulation employing synthetic resins or in the field of cross-linking agent for synthetic resins, there has been an intensive effort to find out the means for improving thermal stability of such resins or to develop new polymers with improved thermal stability.

As a result of this effort, various new classes of synthetic resins having improved thermal stability have been discovered, including polyimide resin, which is obtained by reacting tetracarboxylic dianhydride with diamine in an organic polar solvent, polyimidazopyrrolone resin, which is described in NASA TN D-31-48 and is obtained by reacting tetracarboxylic dianhydride with tetramine in an organic polar solvent, and the like. However, no satisfactory results have been obtained in the fields of polyester resin, polyamide resin or epoxide resin. Accordingly, it is a principal object of this invention to provide a novel class of imidazopyrrolone dicarboxylic acids which are useful for the production of polyester or polyamide resins with improved thermal stability and are useful as cross linking agent for epoxide resins. Another object of this invention is to provide a method for preparing such a novel imidazopyrrolone dicarboxylic acid. Other objects and advantages of this invention will be apparent from the following description and claims.

BRIEF EXPLANATION OF THE DRAWINGS

Attached drawings.

SUMMARY OF THE INVENTION

Figure 1:
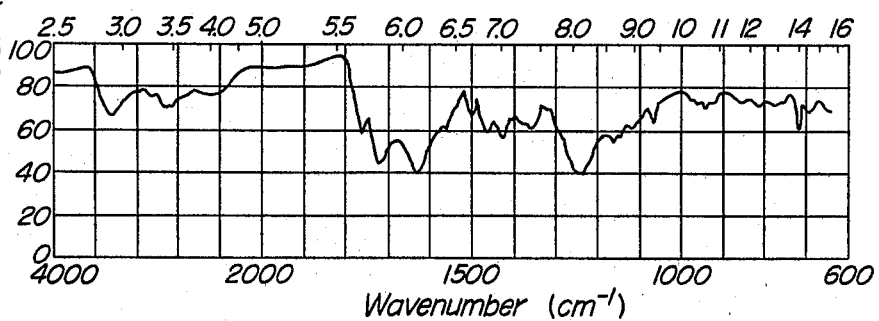
FIGS. 1–3, are the infra-red absorption spectra of the present imidazopyrrolone dicarboxylic acids prepared in Examples 1–3, respectively.

The imidazopyrrolone dicarboxylic acids of the present invention are shown by the general formula:

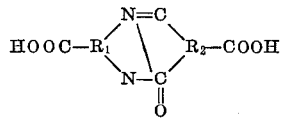

(A)

wherein each of $R_1$ and $R_2$ is a trivalent radical having at least two carbon atoms and is a member selected from the group consisting of aliphatic, aromatic and heterocyclic radicals, and in case of heterocyclic, one of $R_1$ and $R_2$ may contain imidazopyrrolone ring, the same carbon atom or two adjacent of substantially adjacent carbon atoms of said trivalent radical being bonded through single links to the two nitrogen or two carbon atoms of the above formula, thereby forming an imidazopyrrolone nucleus. As stated previously, the present imidazopyrrolone dicarboxylic acids may contain imidazopyrrolone ring in either $R_1$ or $R_2$, which may be represented by the following sub-general Formulae $A^1$ and $A^2$

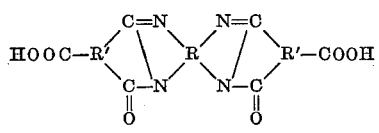

(A¹)

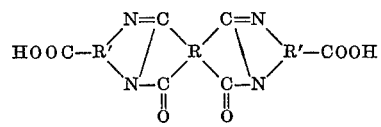

(A²)

wherein R' is a trivalent radical having at least two carbon atoms and is a member selected from the group consisting of aliphatic, aromatic and heterocyclic radicals, the same carbon atom or two adjacent or substantially adjacent carbon atoms of the trivalent radical being bonded through single links to the two nitrogen or carbon atoms of the above formulae, and R is a tetravalent radical having at least two carbon atoms and is a member selected from the group consisting of aliphatic, aromatic, and heterocyclic radicals, in each side of the R the same carbon atom or two adjacent or substantially adjacent carbon atoms of the tetravalent radical being bonded through single links to the two nitrogen or carbon atoms of the above formula, thereby forming a pair of imidazopyrrolone nuclei, in either case.

The imidazopyrrolone dicarboxylic acids represented by the Formula A are in general prepared by the following reaction Formula B.

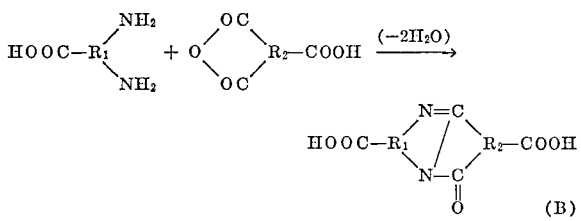

(B)

Likewise, the imidazopyrrolone dicarboxylic acids represented by the Formulae $A^1$ and $A^2$ are prepared by the following reaction Formulae $B^1$ and $B^2$, respectively.

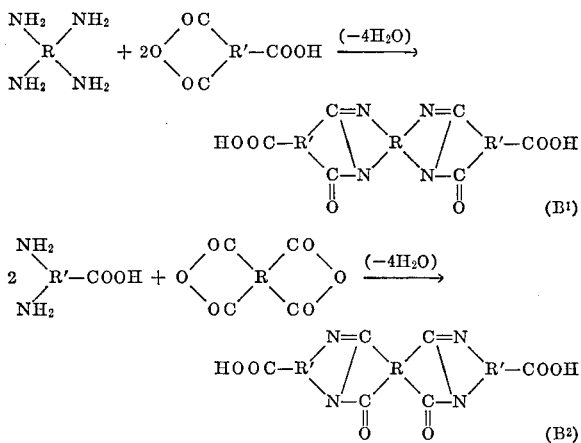

In these formulae, R in the tetra-amine or tetra-carboxylic dianhydride, $R_1$ and $R_2$ in the diamine monocarboxylic acid or tricarboxylic acid anhydride, and R′ are preferably selected from the group consisting of

 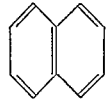 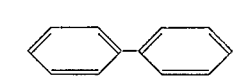

and

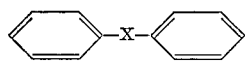

wherein X is C, N, Si, P, S or O.

The following members are also included in these radicals:

   

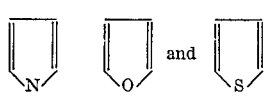 and 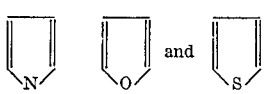

A pair of amino radicals or carbonyl radicals are bonded through single links to the same carbon atom or two adjacent carbon atoms of one of these radicals. However, these radicals may be attached to two substantially adjacent carbon atoms as in the case of naphthalene 1,2 or naphthalene 5,6. The tetra-amine compounds adapted for use in the practice of this invention may include 3,3′-diaminobenzidine, 1,2,4,5 - tetra-aminobenzene, 3,3′,4,4′-tetra-aminodiphenylsulfide, 3,3′,4,4′-tetra - amino-diphenyl methane, 3,3′,4,4′-tetra-amino-diphenyl ketone and the like. Typical examples of tricarboxylic acid anhydride may include trimellitic anhydride, 3,4,4′-diphenyl ether tri-carboxylic acid anhydride, and ethylene tricarboxylic acid annydride. Examples of diamino - monocarboxylic acids may include 2,3-diamino-benzoic acid, 3,4-diamino- benzoic acid, 5,6 - diamino-3-nicotic acid, 2,3-diamino-2-naphthoic acid, and 3,4-diamino-hydro-cinnamic acid.

As for the tetracarboxylic dianhydride employed in the practice of the present invention, there include pyromellitic dianhydride, 2,3,6,7 - naphthalene - tetracarboxylic dianhydride, 3,3′,4,4′ - diphenyl-tetracarboxylic dianhydride, 3,3′,4,4′ - benzophenone tetracarboxylic dianhydride, 2,2-bis (3,4-dicarboxyphenyl) - propane dianhydride, 1,2,3,4 - cyclopentane tetracarboxylic dianhydride, bis (3,4-dicarboxyphenyl) sulfone dianhydride, perillene-3,4,9,10-tetracarboxylic dianhydride, bis (3,4 - dicarboxyphenyl) ether dianhydride, and ethylene tetracarboxylic dianhydride. In the preparation of imidazopyrrolone dicarboxylic acid according to this invention, thorough attention should be paid to the precise control of employing amounts of each reaction ingredient, and of temperature elevating rate, since each of these factors has a great influence on the yield of imidazopyrrolone dicarboxylic acid.

For example, when a larger excess amount of tetra-amine is reacted with tricarboxylic anhydride, the following Compound $C_1$ will be obtained as a main product.

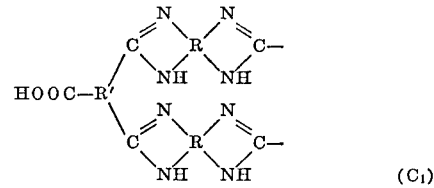

($C_1$)

On the other hand, if a larger excess amount tricarboxylic anhydride is reacted with tetraamine, the following Compound $C_2$ will obtain as a main product.

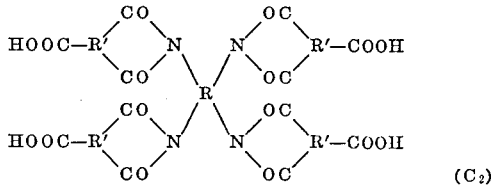

($C_2$)

The formation of imidazopyrrolone dicarboxylic acid in the present method, in general, occurs in two steps as shown, for example, below in the reaction Formulae $D_1$ and $D_2$.

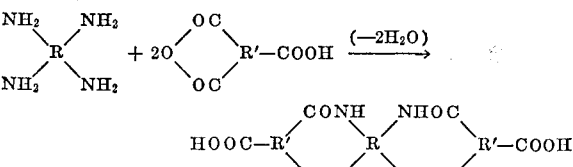

($D_1$)

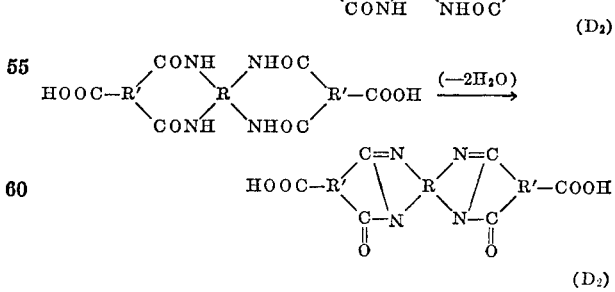

($D_2$)

However, especially in the case of employing no solvent, too rapid elevation of reaction temperature will cause such as ($C_1$) and ($C_2$). Therefore, it is desirable to employ saoichiometric amounts of reagents or adequately controlled amounts of reagent (i.e. one reagent being at most in 25% excess of the stoichiometric amount thereof), and to employ an appropriate temperature elevating rate (e.g. in case of emplaying no solvent, the preferable range being 2–5° C. per minute).

In a preferred embodiment of the present method employing no solvent, approximately stoichiometric amounts of reagents are placed in a reaction vessel equipped with mechanical stirrer, and while stirring and introducing inert gas (e.g. nitrogen gas) therein, the reaction mixture is gradually heated up to 140–250° C. with the care that the temperature of the mixture is elevated at a rate of 2–5° C. per minute. Thereafter, the introduction of inert gas is stopped and the mixture is further heated at 200–300° C. under a vacuum of about 0.1 mm. Hg, for a sufficient time to complete the inter-molecular condensation reaction. In another embodiment of the present method employing a solvent, approximately stoichiometric amounts of reagents are dissolved in an inorganic or organic solvent and thus prepared solution is, while introducing or not introducing inert gas therein, refluxed for 2–10 hours to complete the reaction. In this case, various solvents having no harmful effect on the reaction may successfully be employed and typical examples of such solvenst may include glacial acetic acid, phenol, cresol, xylenol, pyridine, dimethyl acetamide, dimethyl formamide, N-methyl-2-pyrrolidone, polyphosphoric acid and the like.

Thus prepared imidazopyrrolone dicarboxylic acids are in general hard soluble in water and in organic solvents, and are characterized by having an excellent thermal stability and having considerably higher melting point of more than 300° C. The present imidazopyrrolone dicarboxylic acids are very useful as the raw materials of polyester and polyamide resins and as the cross-linking agents for expoxide and other synthetic resins. Examples of the invention:

Further details can be seen from the following examples which are given solely for the purpose of illustration and are not to be construed as limitations of this invention. Unless otherwise stated, the parts therein are by weight.

Example 1

1.92 parts of trimellitic anhydride and 1.15 parts of 3,3',4,4'-tetra-amino-diphenylether were placed in a three-neck flask equipped with stirrer and thermometer and the mixture was, under nitrogen streams, heated up to 150° C. with a temperature elevating rate of 2° C./minute. During said heating, the mixture began to melt and the formation of water was observed.

After stopping the nitrogen supply, the mixture was further heated at 200° C. under 0.1 mm. Hg, for 2 hours. Thus obtained reaction mixture was dissolved in 50 parts of dimethyl sulfoxide and the solution was poured into 50% ethanol aqueous solution to precipitate yellow reaction product. Analytical data showed that this product was the imidazopyrrolone dicarboxylic acid of the structural formula:

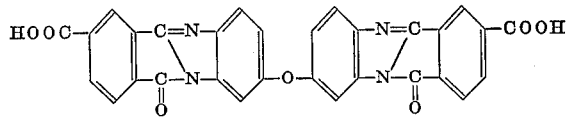

Melting point: 314–316° C.

Elementary analysis.—Calculated (as $C_{30}H_{14}O_7N_4$): C, 66.42%; H, 2.58%; N, 10.33%. Found: C, 66.32%; H, 2.65%; N, 10.21%. Infra-red absorption spectrum: (shown in FIG. 1).

Example 2

1.92 parts of trimellitic anhydride and 1.14 parts of 3, 3',4,4'-tetra-aminodiphenyl methane were reacted as described in Example 1 and yellow precipitated product was obtained.

Figure 2:
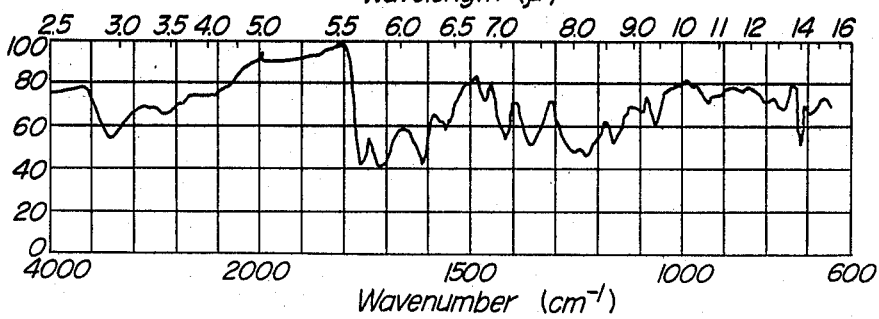

Melting point of this product was 280–282° C. and elementary analysis data was as follows. Calculated as ($C_{31}H_{16}O_6N_4$): C, 68.89%; H, 2.96%; N, 10.37%. Found: C, 68.87%; H, 3.12%; N, 10.54%. Infra-red absorption specrtum was shown in FIG. 2. Analytical data indicated that this product was the imidazopyrrolone dicarboxylic acid of the formula:

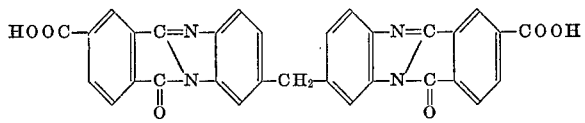

Example 3

1.92 parts of trimellitic anhydride, 1.07 parts of 3,3'-diaminobenzidine and 50 parts of pyridine were placed in a reaction vessel equipped with mechanical stirrer, condenser, and thermometer, and the mixture was, while stirring and introducing nitrogen stream, heated at the reflux temperature of pyridine (i.e. 115° C.) for 10 hours.

Precipitated yellow product was separated, washed with ethylether and dried.

Figure 3:
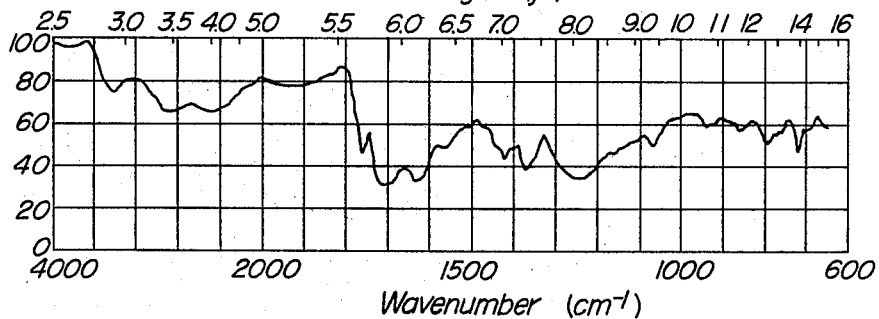

Elementary analysis.—Calculated (as $C_{30}H_{14}O_6N_4$): C, 68.44%; H, 2.66%; N, 10.64%. Found: C, 68.47%; H, 2.74%; N, 10.65%. Infra-red absorption spectrum: (shown in FIG. 3). Analytical data showed that the compound was the imidazopyrrolone dicarboxylic acid of the formula

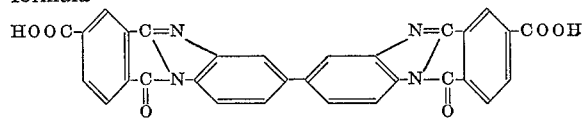

Example 4

Employing the same procedure as described in Example 3, 1.55 parts of trimellitic acid anhydride and 1.80 parts of 3,4-diaminohydrocinnamic acid were reacted in the presence of 50 parts of 116% polyphosphoric acid at 200° C. for 2 hours.

Subsequently, the resulting reaction product was poured into a 50:50 water-ethanol solution, precipitated and separated.

Thus prepared compound was found to be the imidazopyrrolone dicarboxylic acid of the formula:

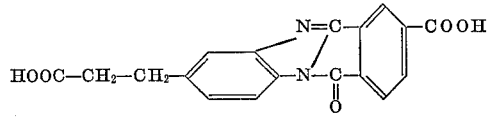

Elementary analysis.—Calculated (as $C_{18}H_{12}O_5N_2$): C, 64.29%; H, 3.57%; N, 8.33%. Found: C, 64.50%; H, 3.54%; N, 8.38%.

Example 5

The procedures of Example 3 were repeated employing 2.68 parts of 3,4,4'-diphenyltricarboxylic anhydride, 1.40 parts of 2,3-diamino benzoic acid and 50 parts of dimethyl acetamide. The reaction was carried out at 190° C. for 5 hours.

Subsequently, the resulting reaction product was poured into a 50:50 water-ethanol solution, precipitated and separated.

Purified product was analyzed and found to be the imidazopyrrolone dicarboxylic acid of the structural formula:

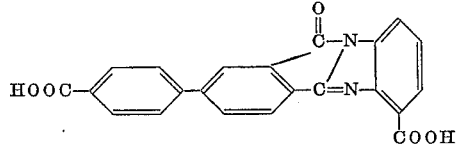

Elementary analysis.—Calculated (as $C_{22}H_{12}O_5N_2$): C, 68.75%; H, 3.13%; N, 7.29%. Found: C, 68.82%; H, 3.10; N, 7.33%.

Example 6

The same procedures as described in Example 3 were repeated with 2.16 parts of pyromellitic dianhydride, 3.06 parts of 5,6-diamino-3-nicotinic acid, and 100 parts of N-methyl-2-pyrrolidone. The reaction was carried out at 210° C. for 3 hours, then the resulting reaction product was poured into a 50:50 water ethanol solution and the precipitated product was separated and purified. This product was found to be the imidazopyrrolone dicarboxylic acid of the structural formula:

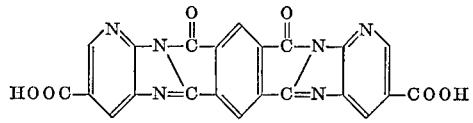

Elementary analysis.—Calculated (as $C_{22}H_8O_6N_6$): C, 58.41%; H, 1.77%; N, 18.58%. Found: C, 58.65%; H, 1.63%; N, 18.61%.

Examples 7–10

Employing the same procedures as described in Example 1. The following tricarboxylic anhydrides and tetraamines as shown in Table 1 were reacted with each other, and four kinds of imidazopyrrolone dicarboxylic acids as shown in Table 2 were obtained, respectively.

TABLE 1

| Example No.: | Tricarboxylic anhydride | Amounts (parts) | Tetraamine | Amounts (parts) |
|---|---|---|---|---|
| 7 | Ethylene tricarboxylic anhydride | 2.88 | 1,2,4,5-tetraamino-benzene | 1.38 |
| 8 | do | 2.88 | 3,3',4,4'-tetraaminodiphenyl sulfide | 2.46 |
| 9 | 3,4,4'-diphenyltricarboxylic anhydride | 5.36 | 3,3',4,4'-tetraaminodiphenyl ketone | 2.42 |
| 10 | Trimellitic anhydride | 3.84 | 1,2,4,5-tetraaminobenzene | 1.38 |

TABLE 2

Product (Structural formula)

Example No.:

7 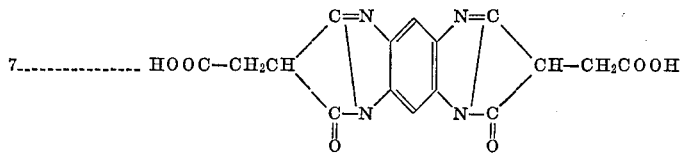

Elementary analysis: Calculated (as $C_{16}H_{10}O_6N_4$): C, 54.24%; H, 2.82%; N, 15.82%. Found: C, 54.44%; H, 2.77%; N, 15.86%.

8 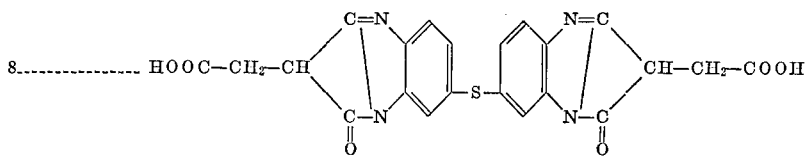

Elementary analysis: Calculated (as $C_{22}H_{14}O_6N_4S_1$): C, 57.14%; H, 3.03%; N, 12.12%. Found: C, 57.16%; H, 3.00%; N, 12.15%.

9 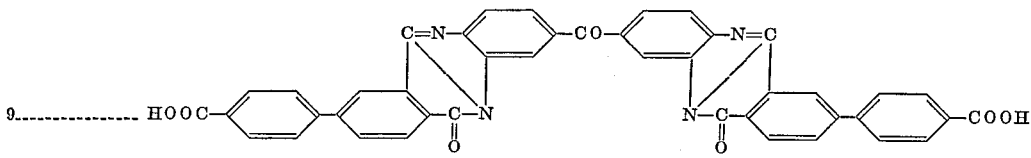

Elementary analysis: Calculated (as $C_{43}H_{22}O_7N_4$): C, 73.08%; H, 3.12%; N, 7.93%. Found: C, 73.26%; H, 3.06%; N, 7.95%.

10 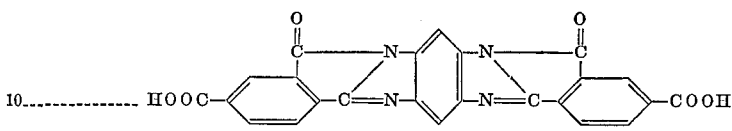

Elementary analysis: Calculated (as $C_{24}H_{10}O_6N_4$): C, 64.00%; H, 2.22%; N, 12.44%. Found: C, 64.12%; H, 2.20%; N, 12.46%.

Examples 11–13

Employing the same procedures as described in Example 4, the following tricarboxylic anhydrides and diamino mono-carboxylic acids as shown in Table 3 were reacted to obtain the imidazopyrrolone dicarboxylic acids as shown in Table 4, respectively.

TABLE 3

| Example No. | Tricarboxylic anhydride | Amounts (parts) | Diamino-monocarboxylic acid | Amounts (parts) |
|---|---|---|---|---|
| 11 | Ethylene tricarboxylic anhydride | 1.44 | 3,4-diamino benzoic acid | 1.52 |
| 12 | Trimellitic anhydride | 1.92 | 2,3-diamino-p-toluylic acid | 1.66 |
| 13 | do | 1.92 | 4,5-diamino-2-naphthoic acid | 2.02 |

TABLE 4

Product (structural formula)

Example No.:

11............

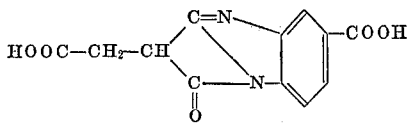

Elementary analysis: Calculated (as $C_{12}H_8O_5N_2$): C, 55.38%; H, 3.08%; N, 10.77%. Found: C, 55.61%; H, 3.05%; N, 10.79%.

12............

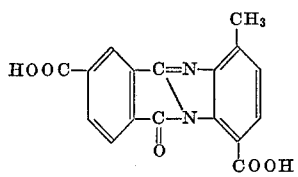

Elementary analysis: Calculated (as $C_{17}H_{10}O_5N_2$): C, 63.35%; H, 3.11%; N, 8.70%. Found: C, 63.36%; H, 3.07%; N, 8.71%.

Example No.:

13............

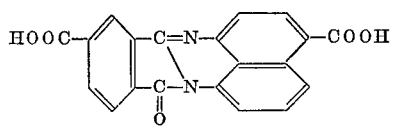

Elementary analysis: Calculated (as $C_{20}H_{10}O_5N_2$): C, 67.04%; H, 2.79% N, 7.82%. Found: C, 67.27%; H, 2.78%; N, 7.82%.

Examples 14–20

Employing the same procedures as described in Example 6, the following tetra-carboxylic dianhydrides and diamino-monocarboxylic acids as shown in Table 5 were reacted to the obtain the imidazopyrrolone dicarboxylic acids shown in Table 6, respectively.

TABLE 5

| Example No. | Tetra-carboxylic dianhydride | Amounts (parts) | Diamino-mono-carboxylic acid | Amounts (parts) |
|---|---|---|---|---|
| 14 | 3,3',4,4'-benzophenone tetracarboxylic dianhydride | 3.22 | 3,4-diaminobezoic acid | 3.04 |
| 15 | 2,3,6,7-naphthalene tetracarboxylic dianhydride | 2.24 | 2,3-diamino-p-toluylic acid | 3.32 |
| 16 | 3,3',4,4'-diphenylmethane tetracarboxylic dianhydride | 3.08 | do | 3.32 |
| 17 | Ethylene tetracarboxylic dianhydride | 1.70 | 3,4-diaminobenzoic acid | 3.04 |
| 18 | 1,2,3,4-cyclopentane tetracarboxylic dianhydride | 2.46 | do | 3.04 |
| 19 | do | 2.46 | 4,5-diamino-2-naphthoic acid | 4.04 |
| 20 | do | 2.46 | 3,4-diaminohydrocinnamic acid | 3.56 |

TABLE 6

Product (structural formula)

Example No.:

14..............

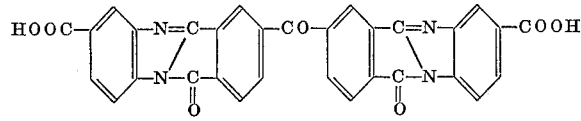

Elementary analysis: Calculated (as $C_{31}H_{14}O_7N_4$): C, 67.15%; H, 2.53%; N, 10.11%. Found: C, 67.28%; H, 2.50%; N, 10.15%.

15..............

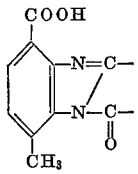

Elementary analysis: Calculated (as $C_{30}H_{16}O_6N_4$): C, 68.18%; H, 3.03%; N, 10.61%. Found: C, 68.33%; H, 3.01%; N, 10.64%.

16..............

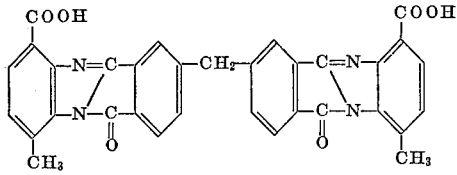

Elementary analysis: Calculated (as $C_{33}H_{20}O_6N_4$): C, 69.72%; H, 3.52%; N, 9.86%. Found: C, 69.90%; H, 3.34%; N, 9.88%.

17..............

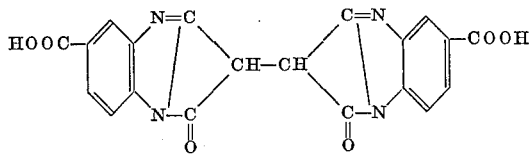

Elementary analysis: Calculated (as $C_{26}H_{13}O_6N_4$): C, 59.70%; H, 2.49%; N, 13.93%. Found: C, 59.91%; H, 2.45%; N, 13.99%.

TABLE 6.—Continued

| Example No.: | Product (structural formula) |
|---|---|
| 18 | 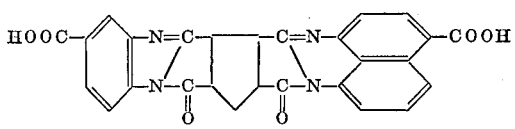 |

Elementary analysis: Calculated (as $C_{23}H_{14}O_6N_4$): C, 62.44%; H, 3.17%; N, 12.67%.
Found: C, 62.66%; H, 3.12%; N, 12.70%.

| 19 | 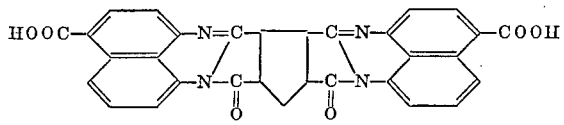 |

Elementary analysis: Calculated (as $C_{31}H_{18}O_6N_4$): C, 68.63%; H, 3.32%; N, 10.33%.
Found: C, 68.83%; H, 3.12%; N, 10.37%.

| 20 | 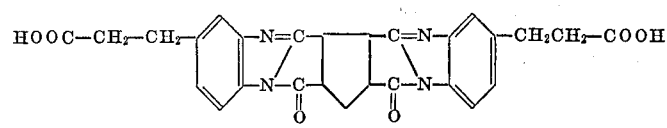 |

Elementary analysis: Calculated (as $C_{27}H_{22}O_6N_4$): C, 65.06%; H, 4.42%; N, 11.24%.
Found: C, 65.20%; H, 4.40%; N, 11.28%.

Infrared spectra of the imidazopyrrolone dicarboxylic acids obtained in accordance with Examples 4 to 20 were measured. As a result, in every case of the above measurements, absorption band of 2000–3000 cm.$^{-1}$ by carboxyl group, those of 1765, 1720 and 720 cm.$^{-1}$ by carboxyl group, those of 1620 and 1565 cm.$^{-1}$ by C=N group and that of 1360 cm.$^{-1}$ by C—N group were remarkably observed. While no absorption band of 1780 cm.$^{-1}$ by imide group and those of 1650, 1540 and 1280 cm.$^{-1}$ by amide group were observed. Furthermore, each melting point of the respective imidazopyrrolone dicarboxylic acids were found to be above 360° C.

For the purpose of illustrating the usefulness of the present imidazopyrrolone dicarboxylic acids, polyester resins were prepared by employing the present dicarboxylic acids and thus prepared resins were coated on wires.

Example 21

Polyester was prepared according to a known method by using 400 grams of dimethyl terephthalate, 110 grams of ethylene glycol and 75 grams of glycerol. To this polyester, 140 grams of imidazopyrrolone dicarboxylic acid obtained by the method of Example 1 were added, and the mixture was stirred and heated at 180° C. When the added imidazopyrrolone dicarboxylic acid was completely dissolved in the polyester, 1.8 grams of cadmium acetate were added, and the mixture was heated up to 220° C. and reacted for 3 hours, under vacuum, at the same temperature. Thus prepared polyester resin was diluted with 450 grams of commercial cresol and the solution was further added with a solution of 9 grams butyl titanate in 27 grams commercial cresol. Thereafter, a mixed solvent of 1 part solvent naphtha and 2 parts commercial cresol was added thereto adjust the solid content in the solution to 35% of the total weight.

Thus prepared enamel varnish was coated on an annealed copper wire (diameter 1.0 mm.) and baked under the conditions of baking rate 7 m./minute and baking temperature 470° C. This procedure was repeated 6 times on the same copper wire, thereby obtained an enamel insulated wire having an insulating thin film (0.05 mm. in thickness) thereon. When the insulated wire was compared with a conventional polyester enamel insulated wire, it was found that the former possessed a far improved heat resistance, impact strength, and abrasion resistance as compared with those of the latter.

Example 22

110 grams of ethylene glycol, 75 grams of glycerol and 200 grams of imidazopyrrolone dicarboxylic acid obtained in Example 2 were reacted at 200° C. for 5 hours. To this, 400 grams of dimethyl terephthalate were added, and the mixture was reacted at 170° C. for 5 hours and subsequently at 240° C. for 5 hours.

Thus reacted mixture was diluted with 450 grams of commercial cresol, and further added with a solution of 9 grams butyl titanate in 27 grams commercial cresol and with a mixed solvent of 2 parts solvent naphtha and 1 part commercial cresol to prepare an enamel varnish.

When the varnish was applied on an annealed copper wire (diameter 1.0 mm.) as in Example 21, a good quality enamel insulated wire with an improved heat resistance, impact strength and abrasion resistance was obtained.

We claim:
1. An imidazopyrrolone dicarboxylic acid having the formula:

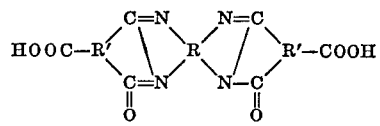

wherein >R< is a tetravalent radical of the group consisting of

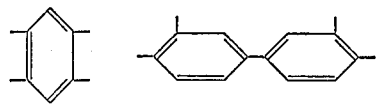

and

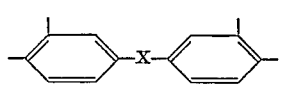

wherein X is a member of the group consisting of $CH_2$, S, O and CO; wherein —R'< is a trivalent radical of the group consisting of

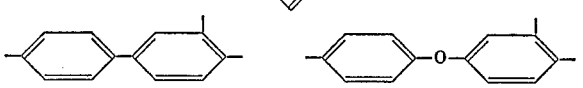

and

wherein the N atoms in each imidazopyrrolone nucleus

are bonded to ortho carbon atoms of >R<; and wherein the C atoms in each of said imidazopyrrolone nuclei are bonded to the same or ortho carbon atoms of —R'<.

2. An imidazopyrrolone dicarboxylic acid having the structural formula:

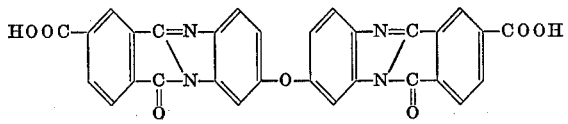

3. An imidazopyrrolone dicarboxylic acid having the formula:

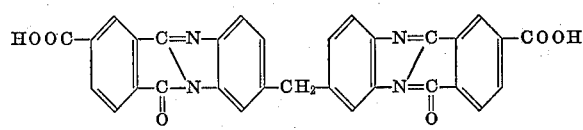

4. An imidazopyrrolone dicarboxylic acid having the formula:

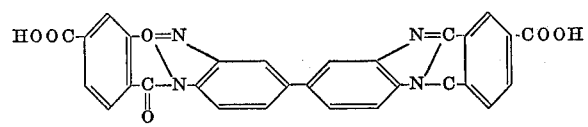

5. An imidazopyrrolone dicarboxylic acid having the formula:

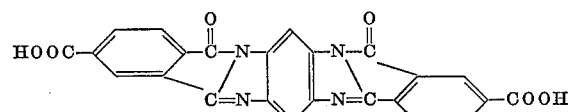

6. An imidazopyrrolone dicarboxylic acid having the formula:

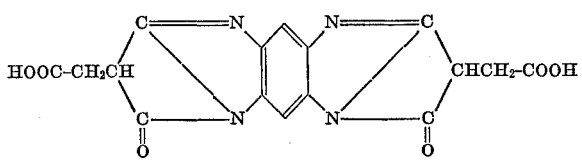

7. An imidazopyrrolone dicarboxylic acid having the formula:

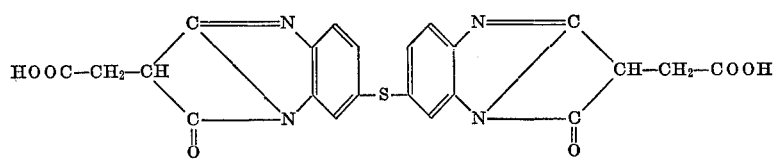

8. An imidazopyrrolone dicarboxylic acid having the formula:

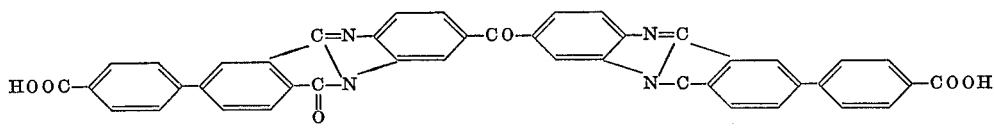

9. A process for producing an imidazopyrrolone dicarboxylic acid as set forth in claim 1, which comprises heating approximately one mole of a tetramine having the formula:

wherein >R< is a member of the group consisting of

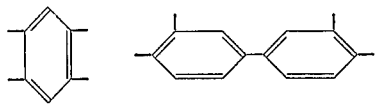

and

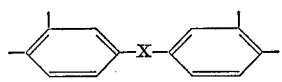

in which X is $CH_2$, S, O or CO, with approximately two moles of a tricarboxylic acid anhydride having the formula:

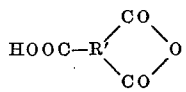

wherein —R'< is a member of the group consisting of

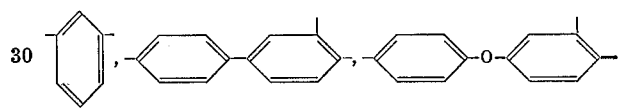

and

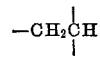

in an inert atmosphere, in the substantial absence of a solvent, at a temperature of 140° C. to 250° C. to melt and condense said triamine and said anhydride, and then heating the same at a temperature of 200° C. to 300° C. under a reduced pressure to effect intramolecular condensation.

10. A process for producing an imidazopyrrolone dicarboxylic acid as set forth in claim 1, which comprises heating approximately one mole of a tetramine having the formula:

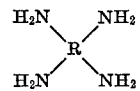

wherein >R< is a member of the group consisting of

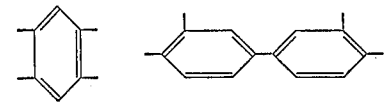

and in which X is $CH_2$, S, O or CO, with approximately two moles of a tricarboxylic acid anhydride having the formula:

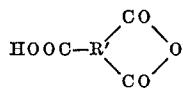

wherein —R'< is a member of the group consisting of

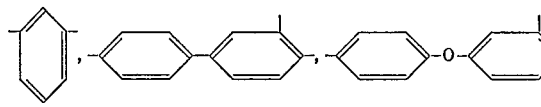

and

in an inorganic or organic solvent at the reflux temperature of said solvent to effect condensation and intramolecular condensation.

References Cited

UNITED STATES PATENTS

| | | | |
|---|---|---|---|
| 2,884,423 | 4/1959 | Wilkinson | 260—256.4 |
| 2,949,467 | 8/1960 | Staeuble | 260—256.4 |

FOREIGN PATENTS 1,189,218  3/1965  Germany.

ALEX MAZEL, Primary Examiner

R. J. GALLAGHER, Assistant Examiner

U.S. Cl. X.R.

117—232; 260—75, 251, 256.4, 295.5, 346.3, 518